US010358082B1

(12) United States Patent
Kinney

(10) Patent No.: US 10,358,082 B1
(45) Date of Patent: Jul. 23, 2019

(54) ADVANCED WARNING LIGHTING SYSTEMS AND METHODS

(71) Applicant: Kinney ASWD Holding Company, LLC, Madison, AL (US)

(72) Inventor: Gary Wayne Kinney, Madison, AL (US)

(73) Assignee: Kinney ASWD Holding Company, LLC, Madison, AL (US)

( * ) Notice: Subject to any disclaimer, the term of this patent is extended or adjusted under 35 U.S.C. 154(b) by 0 days.

(21) Appl. No.: 16/046,625

(22) Filed: Jul. 26, 2018

(51) Int. Cl.
*B60Q 1/44* (2006.01)
*H04L 12/40* (2006.01)

(52) U.S. Cl.
CPC .......... *B60Q 1/44* (2013.01); *B60Q 2300/114* (2013.01); *H04L 2012/40215* (2013.01)

(58) Field of Classification Search
None
See application file for complete search history.

(56) References Cited

U.S. PATENT DOCUMENTS

| 6,417,767 | B1* | 7/2002 | Carlson | B60Q 1/445 |
| | | | | 340/438 |
| 6,933,837 | B2 | 8/2005 | Gunderson | |
| 7,463,139 | B2 | 12/2008 | Burlak | |
| 7,482,916 | B2 | 1/2009 | Au | |
| 7,653,215 | B2 | 1/2010 | Stam | |
| 8,482,397 | B1* | 7/2013 | Tajiri | B60Q 1/44 |
| | | | | 340/441 |
| 8,818,620 | B1 | 8/2014 | Sitarski | |
| 8,909,426 | B2 | 12/2014 | Rhode et al. | |
| 8,957,772 | B2 | 2/2015 | Mauderer | |
| 9,081,653 | B2 | 7/2015 | Ricci et al. | |
| 9,134,986 | B2 | 9/2015 | Ricci | |
| 9,327,642 | B2* | 5/2016 | Hammock | B60Q 1/445 |
| 9,440,627 | B2 | 9/2016 | Kurtovic et al. | |
| 9,829,883 | B1 | 11/2017 | Lavoie et al. | |
| 2007/0016348 | A1* | 1/2007 | Long | B60Q 1/444 |
| | | | | 701/49 |
| 2012/0116632 | A1 | 5/2012 | Bechtel | |
| 2012/0218098 | A1* | 8/2012 | Ali | B60Q 1/2673 |
| | | | | 340/467 |
| 2012/0323443 | A1 | 12/2012 | Risse | |

(Continued)

FOREIGN PATENT DOCUMENTS

AU WO 2017152234 A1 9/2017
DE 2 141 063 A1 6/2010

(Continued)

*Primary Examiner* — Emily C Terrell
(74) *Attorney, Agent, or Firm* — Dennen IP Law, LLC

(57) ABSTRACT

An advanced warning light system of a vehicle of the present disclosure has a controller area network (CAN) bus for transmitting messages between a plurality of controllers. Further, the system has at least one controller configured for monitoring operations of a vehicle and the at least one controller transmits a message on the CAN bus when a monitored operation occurs on the vehicle that indicates that the vehicle is slowing down. Additionally, the system has a processor that receives the message from the CAN bus indicating that the vehicle is slowing down and transmits a signal to an advanced warning light that illuminates the advanced warning light to indicate to a driver following the vehicle that the vehicle is slowing down.

32 Claims, 9 Drawing Sheets

(56) References Cited

U.S. PATENT DOCUMENTS

| | | |
|---|---|---|
| 2013/0282946 A1 | 10/2013 | Ricci |
| 2014/0012465 A1 | 1/2014 | Shank |
| 2014/0055254 A1 | 2/2014 | Adams |
| 2016/0306766 A1 | 10/2016 | Ricci |
| 2016/0318475 A1 | 11/2016 | Honkanen |
| 2017/0151994 A1* | 6/2017 | Braunberger ............ B62J 99/00 |
| 2017/0222828 A1 | 8/2017 | Six et al. |

FOREIGN PATENT DOCUMENTS

| | | | |
|---|---|---|---|
| GB | WO 2016135435 A1 | 9/2016 | |
| IT | WO 2015025245 A2 | 2/2015 | |
| NL | WO 2014102171 A1 | 7/2014 | |
| WO | WO 2017131763 A1 | 8/2017 | |

* cited by examiner

ADVANCED WARNING LIGHTING SYSTEMS AND METHODS

BACKGROUND

Driving on the road can be hazardous for many reasons. In one scenario, it is oftentimes difficult when driving behind a vehicle to know whether the vehicle is slowing down. Indeed, when a driver of the vehicle applies pressure to a brake in the vehicle, braking lights illuminate on the back of the vehicle.

However, prior to the driver applying pressure to the brake, there is no warning that a vehicle may be slowing down or that the brake may be applied soon. In this regard, a driver of the vehicle may decrease the speed of the vehicle by simply letting up on the accelerator. In such a scenario, there is presently no lighting system that makes the driver(s) behind the vehicle aware that the vehicle may be slowing down despite that no pressure is being applied to the brake. An Advanced Warning Signal Device (ASWD) light provides the rearward driver(s) an indication that the driver of the vehicle ahead may apply the brake and therefore increasing roadway safety by making drivers aware.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure describes an embodiment of an advanced warning lighting system for vehicles. The system operates using the controller area network (CAN) bus of a vehicle and can be either built into the vehicle's operating system or it can be an after-market kit that is installed on the vehicle.

In either embodiment, information is obtained from the CAN bus of the vehicle to determine at least that pressure has been let off the accelerator. Other parameters may be analyzed as well. For example, the speed of the vehicle may be monitored, and the transmission selector may be monitored. In one embodiment, if the vehicle speed is greater than 20 miles per hour, the throttle position is less than a percentage, e.g., 3%, and a brake switch is off, this may signal the system to light the advanced warning lighting system. Other parameters that may be monitored include the distance of a nearest forward vehicle, speed of a nearest forward vehicle, and lighting of a brake light of the nearest forward vehicle. Also, the system may monitor the distance of the nearest forward vehicle and the closure rate with the nearest forward vehicle. Each of these parameters may be used to determine whether the advanced warning lighting system should be activated.

Figure 1:
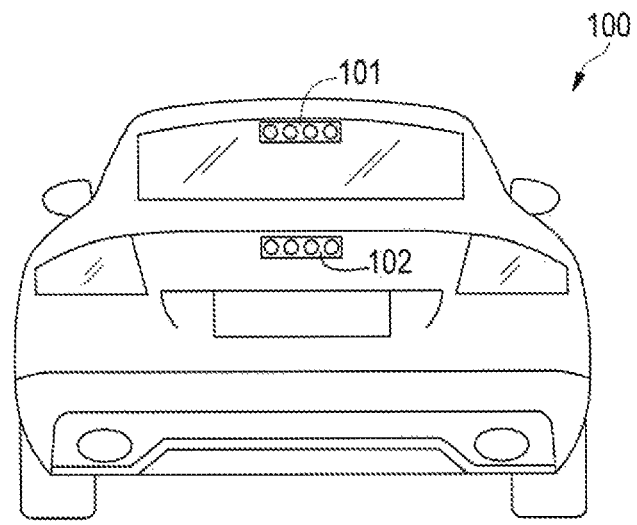
FIG. 1 depicts a car having an advanced warning light in accordance with an embodiment of the present disclosure.

FIGS. 1-4B depict vehicles and exemplary positions of the advanced warning lights. In this regard, FIG. 1 depicts a car 100. The car 100 may have an array of lights 101 that is used as a brake light, for example, and this array of lights 101 may be an array of light emitting diodes (LED). As shown this array of lights 101 may be positioned at the top of the rear window or it may have array of lights 101 on the back end of the vehicle, e.g., on the trunk. Of this array of lights 101 at least one of the LEDs in the array of lights 101 is used as an advanced warning light. This advanced warning light will activate when the vehicle slows down, which is described further herein.

Figure 2:
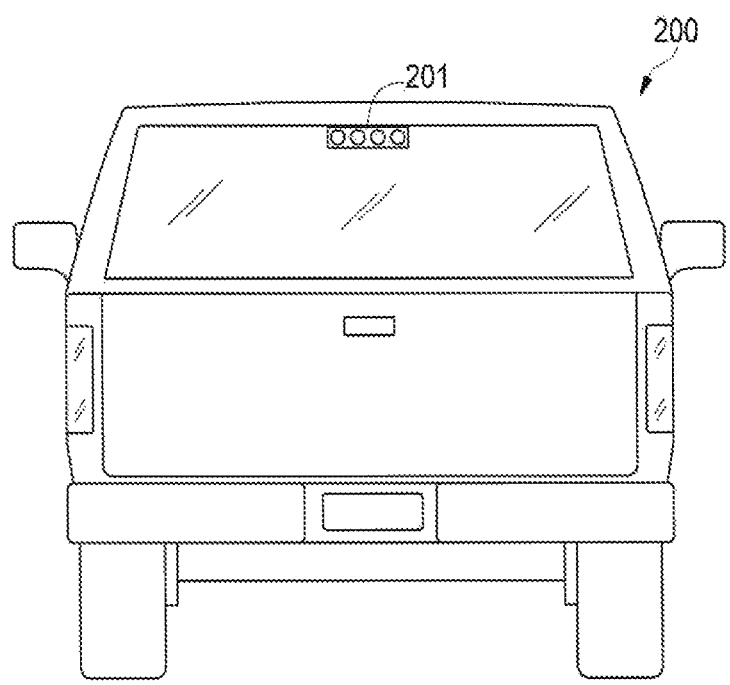
FIG. 2 depicts a truck having an advanced warning light in accordance with an embodiment of the present disclosure.

FIG. 2 depicts a sports utility vehicle (SUV) 200. The SUV 200 has an array of lights 201 that is used as a brake light, for example, and this array of lights 101 may be an array of LEDs. As shown, the array of lights 201 may be positioned at the top of the rear window. Note that the array of lights 201 may be at other positions on the SUV 200 in other embodiments, e.g., on the bumper. Of this array of lights 201 at least one of the LEDs in the array of lights 201 is used as an advanced warning light. This advanced warning light will activate when the vehicle slows down, which is described further herein.

Figure 3:
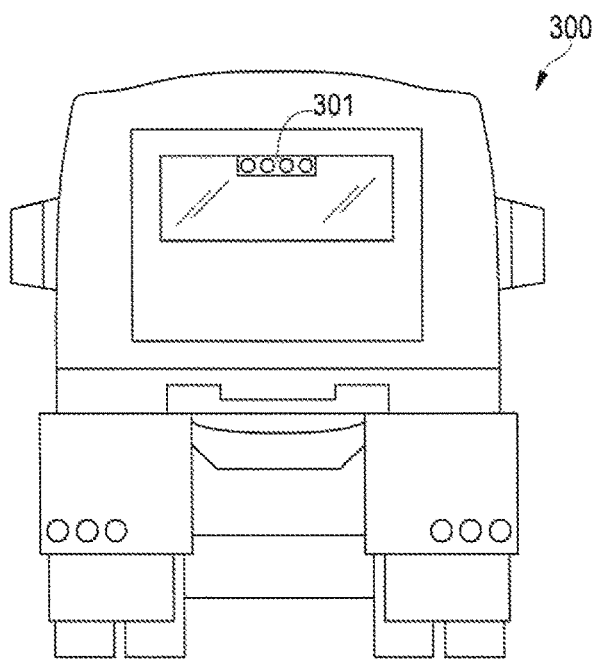
FIG. 3 depicts a tractor trailer cab having an advanced warning light in accordance with an embodiment of the present disclosure.

FIG. 3 depicts a truck cab 300 without a trailer installed thereon. The truck cab 300 has an array of lights 301 that is used as a brake light, for example, and this array of lights 101 may be an array of LEDs. As shown, this array of lights 301 may be positioned at the top of the rear window. In other embodiments, the truck cab 300 may have a wind deflector installed on the top of the cab. In such an embodiment, the array of lights 301 may be installed on the wind deflector. Of this array of lights 301 at least one of the LEDs in the array of lights 301 is used as an advanced warning light. This advanced warning light will activate when the vehicle slows down, which is described further herein.

Figures 4A, 4B:
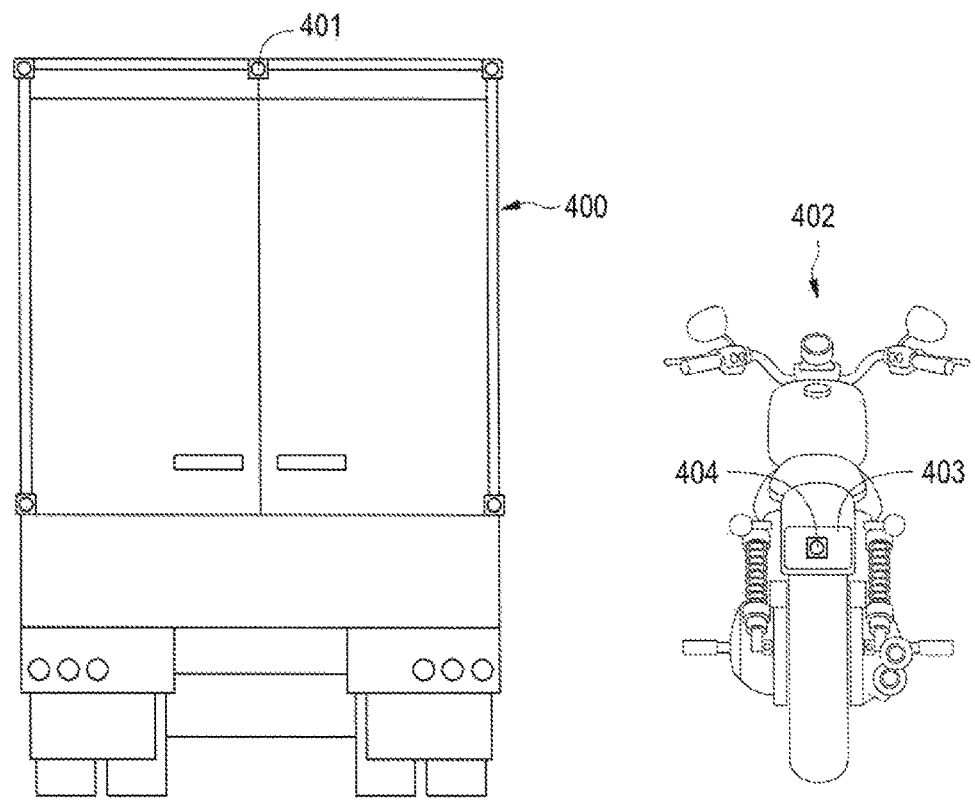
FIG. 4A depicts a tractor trailer having an advanced warning light in accordance with an embodiment of the present disclosure.
FIG. 4B depicts a motorcycle having an advanced warning light in accordance with an embodiment of the present disclosure.

FIG. 4A depicts a tractor trailer 400 with the trailer installed thereon. In such an embodiment, the tractor trailer 400 may have an advanced warning lights 401 installed on the back of the trailer at the top of the trailer. Note that the advanced warning light may be installed at other positions on the back of the tractor trailer 400 in other embodiments.

FIG. 4B depicts a motorcycle 402. The motorcycle 402 comprises a brake light 403. In an embodiment of the present disclosure, an advanced warning light 404 is installed in the center of the brake light 403. Note that the advanced warning light 404 may be installed in other positions relative to the brake light 403 in other embodiments.

With reference to FIGS. 1-4B, in operation, the advanced warning lighting system monitors the CAN bus. When it appears from parameters being monitored that the vehicle is slowing down, e.g., the throttle is released, at least one of the lights in the array of lights 101, 102 (FIG. 1), 201 (FIG. 2), 301 (FIG. 3), and light 401 (FIG. 4A) will activate signaling to the driver behind the vehicle that the vehicle is slowing down. In regard to the motorcycle 402, the light 404 activates signaling to the driver behind the vehicle that the vehicle is slowing down. The lights alert the driver of the following vehicle that the driver of the vehicle is slowing down.

In one embodiment, the advanced warning lights in the array of lights 101, 102, 201, and 301, light 401, and the advanced warning light 404 may be light emitting diodes. They may emit any color of light that would be visible to a driver following the vehicles. As an example, the lights may be yellow or orange. This example is not to be limiting in the present disclosure.

In this regard, the advanced warning lights in the array of lights 101, 102, 201, and 301, advanced warning light 401 and advanced warning light 404 can reduce rear end collisions. In this matter, the advanced warning lights in the array of lights 101, 102, 201, and 301, advanced warning light 401, and advanced warning light 404 can promote safer roadways, save lives, reduce injuries, reduce medicinal claim costs, reduce property claim costs, reduce costly vehicle repairs, and save insurance companies payouts. As a result, insurance companies may become more competitive by increasing profit margins, and the savings can be passed on to insurance company carriers and the insured.

Note that the advanced warning lights may be integral with existing lights on the vehicles. In this regard, one of the lights of the existing brake lighting systems may be replaced with a light of a different color, e.g., yellow. Thus, when a driver following a vehicle sees the yellow light activate, this signals the driver that the vehicle that he/she is following is slowing down. With the advance warning lights, the driver can then take appropriate measures to avoid colliding with the vehicle in front of them that is slowing down. Note that as soon as the driver of this vehicle hits his/her brake, the advanced warning lights will deactivate, and the brake lights will activate. This indicates to the driver behind the vehicle that the vehicle is slowing down more rapidly or even stopping.

Note that in one embodiment shown in FIG. 4B, the vehicle is the motorcycle 402. In such an embodiment, the motorcycle has an advanced warning light 404 on the back of the motorcycle integrated within the brake light 403 that is illuminated to indicate that the motorcycle is slowing down. Additionally, an advanced warning light may be integrated into a motorcycle driver's helmet, and the advanced warning light may be illuminated to indicate that the motorcycle is slowing down.

Further note that there are at least two ways of implementing the above-described systems in a vehicle. The system may be implemented by an original equipment manufacturer (OEM). In another embodiment, the system may be implemented by a kit that is installed after market.

Note that as described only one of the lights in the array of lights 101, 201, and 301 may be activated in response to the vehicle slowing down. In other embodiments, more than one light may be activated.

Figure 5:
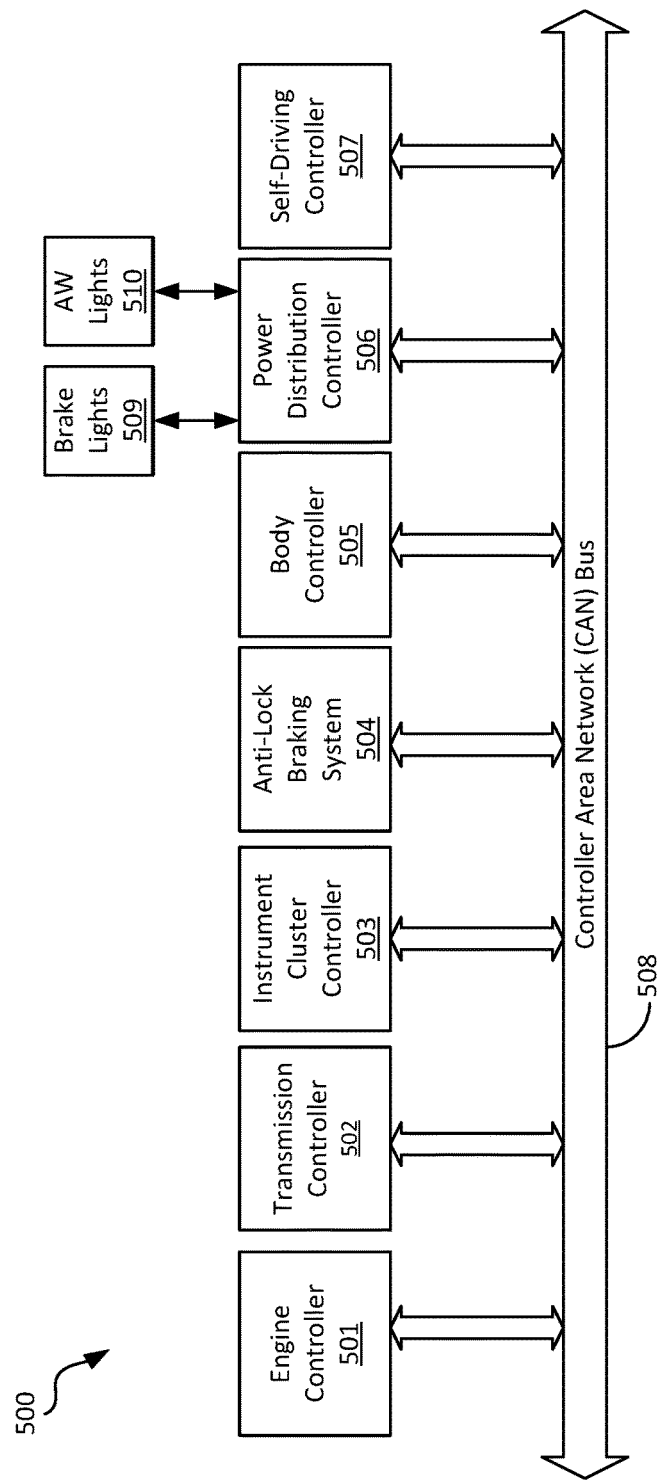
FIG. 5 is a block diagram of an advanced warning light system in accordance with an embodiment of the present disclosure that is installed as an original equipment manufacturer.

FIG. 5 is an advanced warning lighting system 500 in a vehicle in accordance with an embodiment of the present disclosure when installed by an OEM. The system 500 comprises an engine controller 501, a transmission controller 502, an instrument cluster 503, and anti-lock braking system 504, a body controller 505, a power distribution controller 506, and a self-driving processor 507. Each of these controllers communicates with different sensors and components of the vehicle, and each of these controllers communicates over the CAN bus 508.

In operation, the engine controller 501 may monitor various aspects of the vehicle in which the system 500 is installed. In this regard, the engine controller 501 may monitor the manifold (not shown), vacuum pressure in the engine, throttle position, engine speed, brake position, and vehicle speed. These parameters are merely exemplary, and other parameters may be monitored in other embodiments. Note that other vehicles may have different controllers depending upon which systems and options are installed. As the various parameters are monitored, the controllers 501-507 transmit messages on the CAN bus 508 about the parameters being monitored. For example, if the throttle position sensor indicates that pressure on the accelerator has been released, the engine controller 501 transmits a message on the CAN bus 508 that pressure on the accelerator has been released.

In operation, the transmission controller 502 also monitors various parameters. For example, the transmission controller 502 may monitor the drive gear and its current position. In operation, if the drive gear changes positions, the transmission controller 502 transmits a message on the CAN bus 508 that the drive gear has changed positions.

The instrument cluster controller 503 controls information exchange between the vehicle and the driver. In this regard, the instrument cluster controller 503 receives input from instruments and displays data indicative of the input to the driver. In one embodiment, the instrument cluster controller 503 may monitor the speed of the vehicle. In such a scenario, the instrument cluster controller 503 may transmit a message on the CAN bus indicating the speed of the vehicle.

The anti-lock braking system (ABS) 504 is a system that controls braking of the vehicle and transmits a message indicating whether the brake is applied or not applied on the CAN bus 508. In this regard, the ABS monitors wheel speed sensors to determine if one or more wheels are trying to lock up during braking. If a wheel tries to lock up, a series of hydraulic valves limit or reduce the braking on that wheel. This prevents skidding and allows a driver to maintain steering control. In operation, the ABS system 504 may transmit messages on the CAN bus 508 related to such activities.

The body controller 505 is typically responsible for monitoring and controlling various electronic accessories in a vehicle's body. Typically in a vehicle the body controller 505 controls the power windows, power mirrors, air conditioning, immobilizer system, central locking, etc. The body controller 505 communicates with other on-board controllers via the CAN bus 508, and its main application is controlling load drivers—actuating relays that in turn perform actions in the vehicle such as locking the doors or dimming the salon overhead lamp.

The power distribution controller 506 controls power from the vehicle's battery to the several electrical devices on the car. In the present disclosure, at interest, is power that is provided to the brake lights 509 and the advanced warning lights 510 in a vehicle.

The self-driving controller 507 creates and maintains an internal map of the vehicle's surroundings, based on a wide array of sensors, e.g., radar. The self-driving controller 507 processes inputs from the sensors, plots a path, and sends instructions to the vehicle's "actuators," which control acceleration, braking, and steering. Hard-coded rules, obstacle avoidance algorithms, predictive modeling, and "smart" object discrimination (i.e., knowing the difference between a bicycle and a motorcycle) help the software follow traffic rules and navigate obstacles.

In operation, the power distribution controller 506 is configured to receive messages on the CAN bus 508. The power distribution controller 506 analyzes the messages received to determine whether to send power to the advanced warning lights 510. In this regard, different algorithms can be used to determine when advanced warning lights should be illuminated. At a foundational level, if the power distribution controller 506 receives a message that pressure on the throttle has been alleviated, the power distribution controller 506 supplies power to the advanced warning lights 510. As mere examples, the driver may take his/her foot off the acceleration pedal or the driver may select to decrease speed when using cruise control buttons on the user's vehicle. Other algorithms may be used in other embodiments.

As mere examples, the following algorithms may be used. For example, if the transmission selector is in drive, the vehicle speed is greater than 20 miles per hour, the throttle position is less than three percent (3%), and the brake light is off, the power distribution controller 506 may activate the advanced warning light. If all the conditions are not met, the power distribution controller 506 sets the warning light off.

In another embodiment, the system 500 may used forward vision as provided by the self-driving controller 507. In such an embodiment, if the nearest forward vehicle distance is less than fifty (50) feet, the nearest forward vehicle speed is greater than thirty (30) miles per hour, the nearest forward vehicle brake light is on, and the brake switch is off, the power distribution controller 506 may activate the advanced warning light. If all the conditions are not met, the power distribution controller 506 sets the warning light off.

In still another embodiment, the system may again use the forward vision as provided by the self-driving controller 507. In such an embodiment, if the nearest forward vehicle distance is less than one hundred (100) feet, the nearest forward vehicle closure rate is greater than twenty (20) miles per hour, and the brake is off, the power distribution controller 506 may activate the advanced warning light. If all the conditions are not met, the power distribution controller 506 sets the warning light off.

Furthermore, if at any time the driver of the vehicle applies pressure to the brake, the engine controller 501 sends a message that pressure has been applied to the brake. The power distribution controller 506 receives the message over the CAN bus 508, turns off the advanced warning light 510, and turns on the brake lights 509.

Figure 6:
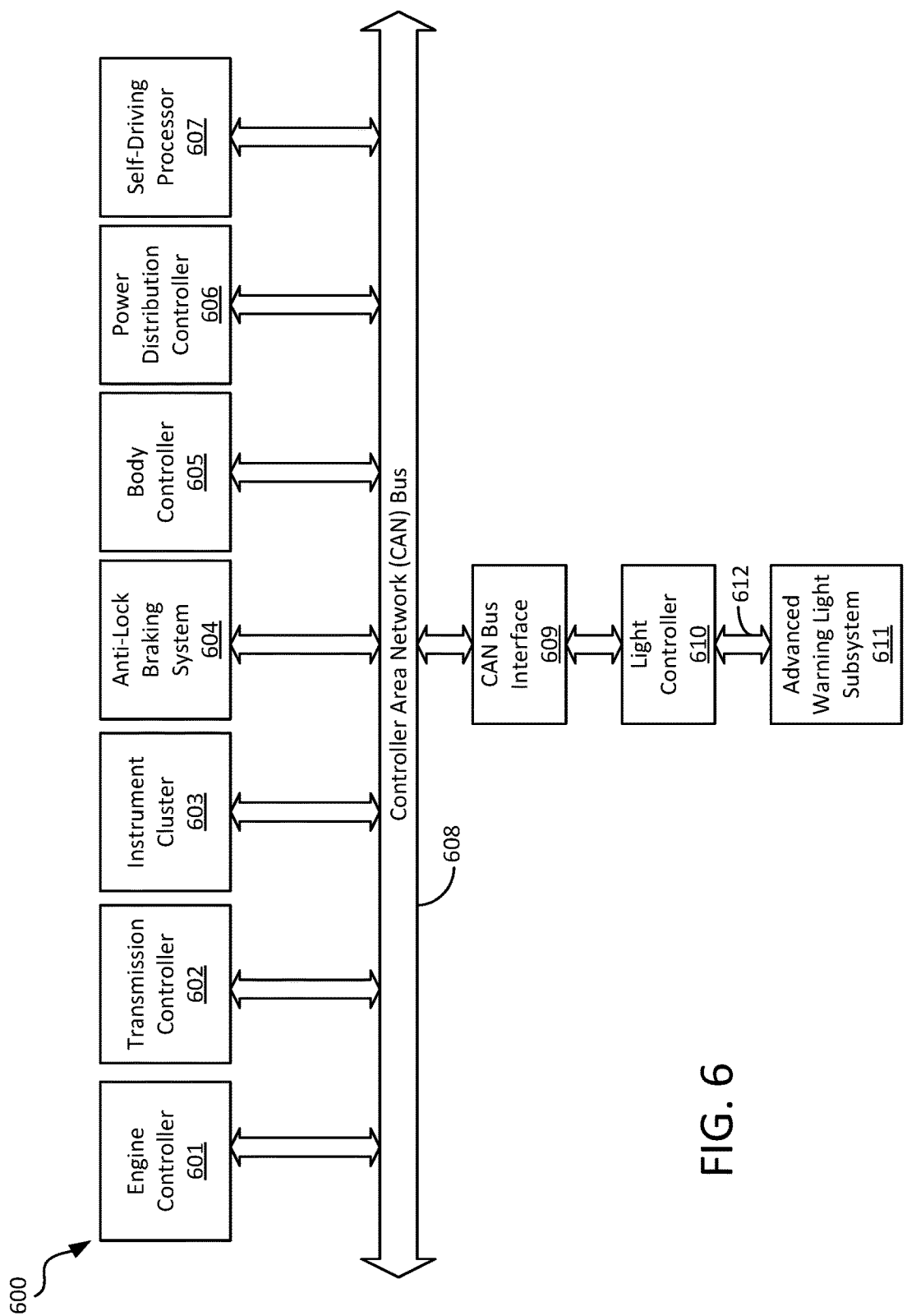
FIG. 6 is a block of an advanced warning light system in accordance with an embodiment of the present disclosure that is installed as an after-market kit.

FIG. 6 is another embodiment of an advanced warning lighting system 600 in a vehicle in accordance with an embodiment of the present disclosure when installed after market as a kit. In such an embodiment, the vehicle comprises the main controllers as described with reference to FIG. 5. In this regard, the vehicle comprises an engine controller 601, a transmission controller 602, an instrument cluster 603, and ABS 604, a body controller 605, a power distribution controller 606, and a self-driving processor 607. As described above, each of these controllers 601-607 monitors certain parameters of the vehicle and transmits messages across the CAN bus 608 related to the parameters monitored.

In addition, the advanced warning lighting system 600 comprises a CAN bus interface 609, a light controller 610, and an advanced warning light subsystem 611. In operation, the CAN bus interface 609 receives messages from the controllers 601-607. The CAN bus interface 609 analyzes messages from the controllers 601-607 to determine if the advanced warning light should be illuminated. In one embodiment, if the CAN bus interface 609 receives a message that pressure has been alleviated from the throttle, this indicates that the advanced warning light should be illuminated.

The CAN bus interface transmits data indicative of a message to the light controller 610 indicting that the advanced warning light should be illuminated. In response, the light controller 610 transmits a signal to the advanced warning light subsystem 611, and the advanced warning light subsystem 611 illuminates the advanced warning light. In one embodiment, the connection 612 is a wireless connection; however, in another embodiment, the connection 612 is a wired connection. Each embodiment is described further herein.

Note that in one embodiment, the advanced warning light may be controlled by the existing power cable that lights the lighting implement. In such an embodiment, the light controller 610 may be configured to temporarily shut down power over the power cable. While the power is not being provided to the lighting implement, the light controller 610 may be configured for transmitting control signals to the advanced warning light subsystem 611 that illuminates the advanced warning light. In response, the lighting implement can be temporarily controlled by the advanced warning light subsystem 611, and the advanced warning light subsystem 611 may be configured for turning on and off the advanced warning light that indicates that the vehicle is slowing down, or the brake has been depressed.

Figure 7:
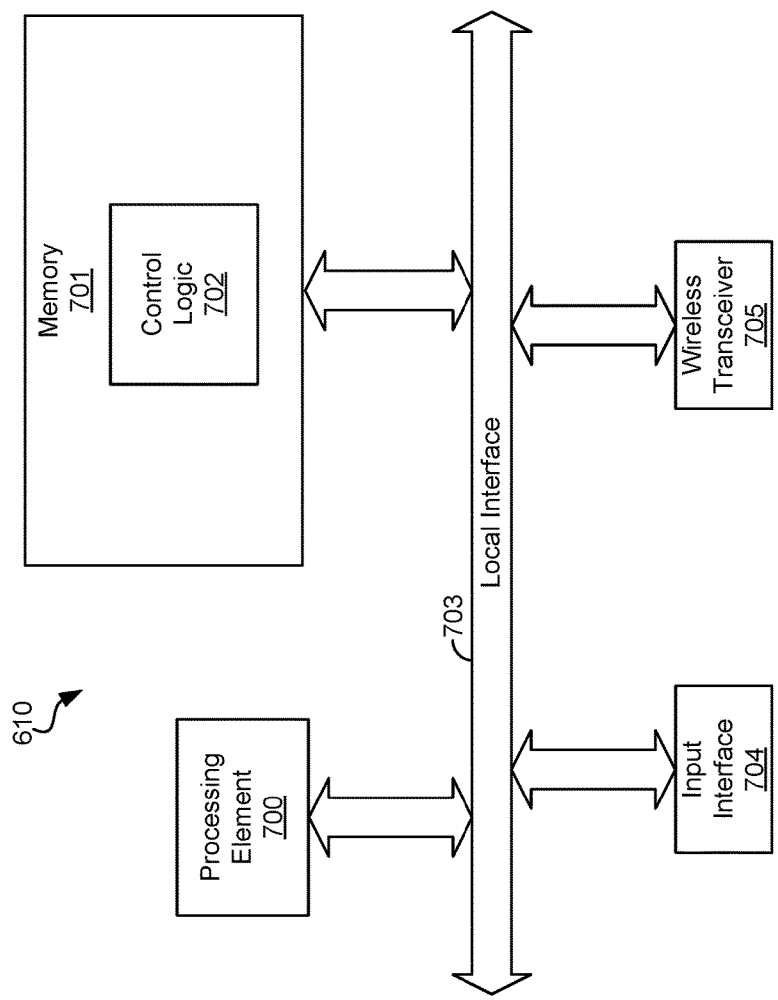
FIG. 7 is a block diagram of an exemplary light controller such as is depicted in FIG. 6 using wireless communication.

FIG. 7 is a block diagram depicting the light controller 610 in an embodiment where the connection 612 (FIG. 6) is a wireless connection. In such an embodiment the light controller 610 comprises a processing element 700, memory 701, an input interface 704, and a wireless transceiver 705. Stored in memory 701 is control logic 702.

The control logic 702 controls the functionality of the light controller 610, as will be described in more detail hereafter. It should be noted that the control logic 702 can be implemented in software, hardware, firmware or any combination thereof. In an exemplary embodiment illustrated in FIG. 7, the control logic 702 is implemented in software and stored in memory 701.

Note that the control logic 702, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the light controller 610 depicted by FIG. 7 comprises at least one conventional processing element 700, such as a digital signal processor (DSP) or a central processing unit (CPU) that communicates to and drives the other elements within the light controller 610 via a local interface 703, which can include at least one bus. Further, the processing element 700 is configured to execute instructions of software, such as the control logic 702.

The input interface 704 is communicatively coupled to the CAN bus interface 609. The input interface 704 receives signals from the CAN bus interface 609 indicating whether the advanced warning light should be illuminated or whether the advanced warning light should be turned off. Additionally, the signal may indicate that the brakes have been applied.

The control logic 702 receives the signals via the input interface 704. In response to receipt of the signals, the control logic 702 determines what type of signal to send to the advanced warning light subsystem 611 via the wireless transceiver 705. In this regard, if the signal received via the input interface 704 indicates that the advanced warning light is to be turned on, the control logic 702 transmits data indicating that the advanced warning light is to be turned on. If the signal received via the input interface 704 indicates that the brakes have been applied, the control logic 702 transmits data to the advanced warning light subsystem indicating that the brake lights are to be turned on and the advanced warning light is to be turned off.

Figure 8:
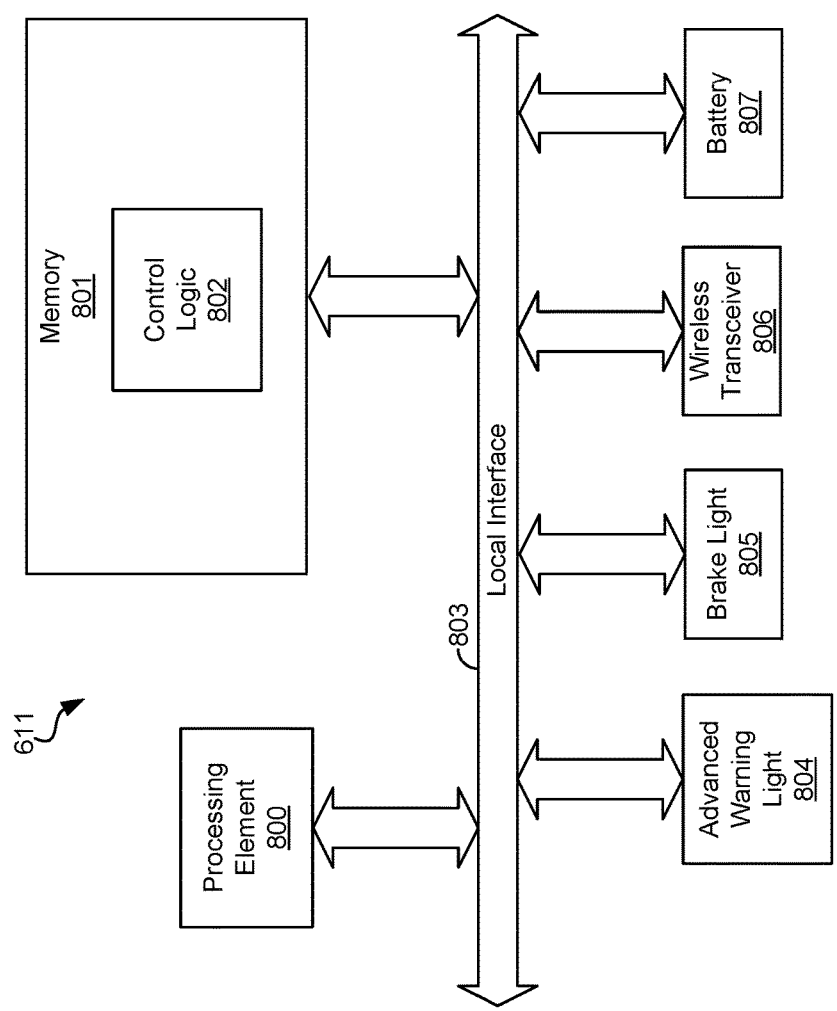
FIG. 8 is a block diagram of an exemplary advanced warning light subsystem such as is depicted in FIG. 6 using wireless communication.

FIG. 8 is a block diagram depicting the advanced warning light subsystem 611 in an embodiment where the connection 612 (FIG. 6) is a wireless connection. In such an embodiment, the advanced warning light subsystem 611 comprises a processing element 800, memory 801, an advanced warning light 804, a brake light 805, a wireless transceiver 806, and a battery 807. Stored in memory 801 is control logic 802.

The control logic 802 controls the functionality of the advanced warning light subsystem 611, as will be described in more detail hereafter. It should be noted that the control logic 802 can be implemented in software, hardware, firmware or any combination thereof. In an exemplary embodiment illustrated in FIG. 8, the control logic 802 is implemented in software and stored in memory 801.

Note that the control logic 802, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the advanced warning light subsystem 611 depicted by FIG. 8 comprises at least one conventional processing element 800, such as a digital signal processor (DSP) or a central processing unit (CPU) that communicates to and drives the other elements within the advanced warning light subsystem 611 via a local interface 803, which can include at least one bus. Further, the processing element 800 is configured to execute instructions of software, such as the control logic 802.

In operation, the advanced warning light subsystem 611 receives signals from the light controller 610 via the wireless transceiver 806. Upon receipt of signals from the light controller 610, the control logic 802 determines whether to activate the advanced warning light 804, deactivate the advanced warning light 804, or activate the brake light 805. In this regard, the signal received indicates whether to activate the advanced warning light 804, deactivate the advanced warning light 804, or activate the brake light 805. In response to the type of signal received, the control logic 802 either transmits a signal to the advanced warning light 804 to turn on the advanced warning light 804, transmits a signal to the advanced warning light 804 to turn off the advanced warning light 804, and/or transmits a signal to the brake light 805 to turn on the brake light 805.

Note that in the wireless embodiment of the present disclosure different types of transceivers may be used in different embodiments. In one embodiment, the transceivers are Bluetooth® transceivers and communicate using Bluetooth® protocol.

Note that the battery 807 provides power to the other components in the advanced warning light subsystem 611. Note that this battery may be a replaceable battery, a rechargeable battery, or any other type of battery known in the art or future-developed.

Figure 9:
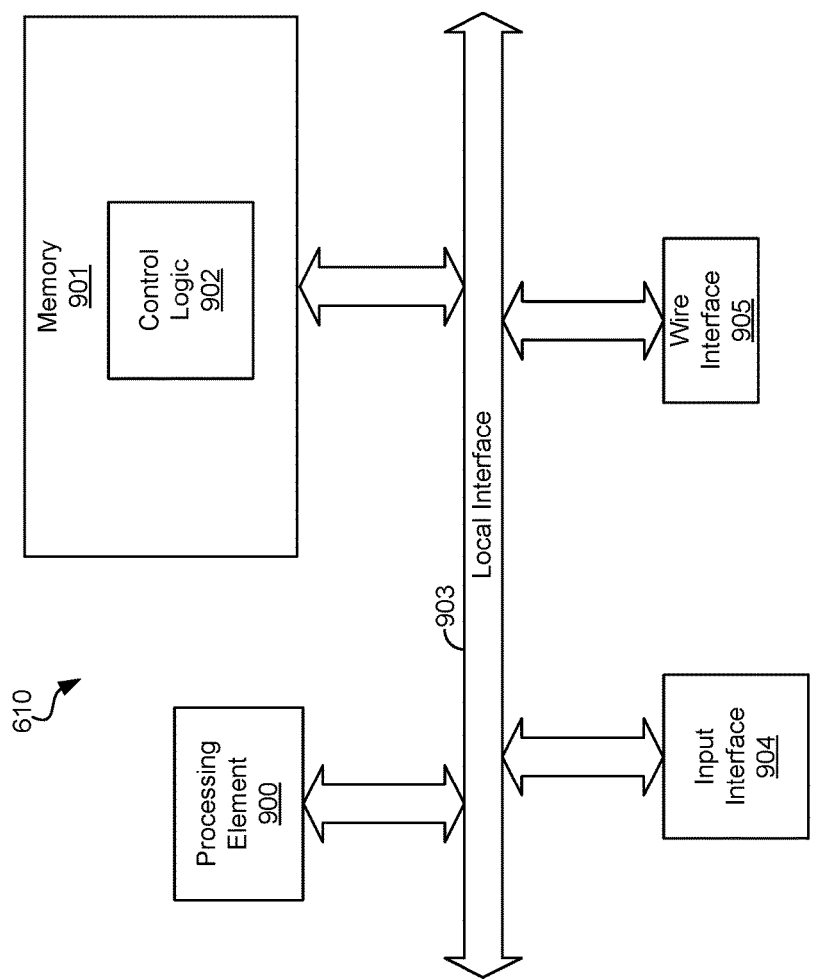
FIG. 9 is a block diagram of an exemplary light controller such as is depicted in FIG. 6 using wired communication.

FIG. 9 is a block diagram depicting the light controller 610 in an embodiment where the connection 612 (FIG. 6) is a wired connection. In such an embodiment, the light controller 610 comprises a processing element 900, memory 901, an input interface 904, and a wire interface 905. Stored in memory 901 is control logic 902.

The control logic 902 controls the functionality of the light controller 610, as will be described in more detail hereafter. It should be noted that the control logic 902 can be implemented in software, hardware, firmware or any combination thereof. In an exemplary embodiment illustrated in FIG. 9, the control logic 902 is implemented in software and stored in memory 901.

Note that the control logic 902, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the light controller 610 depicted by FIG. 9 comprises at least one conventional processing element 900, such as a digital signal processor (DSP) or a central processing unit (CPU) that communicates to and drives the other elements within the light controller 610 via a local interface 903, which can include at least one bus. Further, the processing element 900 is configured to execute instructions of software, such as the control logic 902.

The input interface 904 is communicatively coupled to the CAN bus interface 609. The input interface 904 receives signals from the CAN bus interface 609 indicating whether the advanced warning light should be illuminated or whether the advanced warning light should be turned off. Additionally, the signal may indicate that the brakes have been applied.

The control logic 902 receives the signals via the input interface 904. In response to receipt of the signals, the control logic 902 determines what type of signal to send to the advanced warning light subsystem 611 via a wire that couples the light controller 610 to the advanced warning light subsystem 611. In this regard, if the signal received via the input interface 904 indicates that the advanced warning light is to be turned on, the control logic 902 transmits data indicating that the advanced warning light is to be turned on. If the signal received via the input interface 904 indicates that the brakes have been applied, the control logic 902 transmits data to the advanced warning light subsystem 611 indicating that the brake lights are to be turned on and the advanced warning light is to be turned off.

Figure 10:
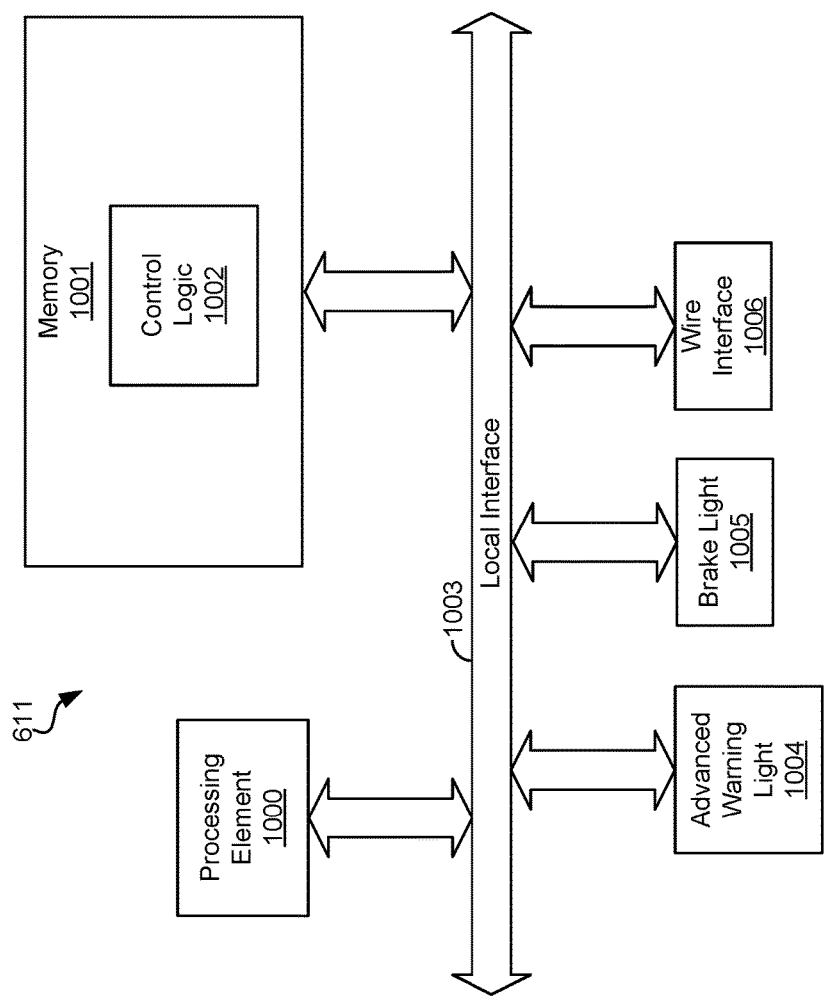
FIG. 10 is a block diagram of an exemplary advanced warning light subsystem such as is depicted in FIG. 6 using wired communication.

FIG. 10 is a block diagram depicting the advanced warning light subsystem 611 in an embodiment where the connection 612 (FIG. 6) is a wired connection. In such an embodiment, the advanced warning light subsystem 611 comprises a processing element 1000, memory 1001, an advanced warning light 1004, a brake light 1005, and a wire interface 1005. Stored in memory 1001 is control logic 1002.

The control logic 1002 controls the functionality of the advanced warning light subsystem 611, as will be described in more detail hereafter. It should be noted that the control logic 1002 can be implemented in software, hardware, firmware or any combination thereof. In an exemplary embodiment illustrated in FIG. 10, the control logic 1002 is implemented in software and stored in memory 1001.

Note that the control logic 1002, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the advanced warning light subsystem 611 depicted by FIG. 10 comprises at least one conventional processing element 1000, such as a digital signal processor (DSP) or a central processing unit (CPU) that communicates to and drives the other elements within the advanced warning light subsystem 611 via a local interface 1003, which can include at least one bus. Further, the processing element 1000 is configured to execute instructions of software, such as the control logic 1002.

In operation, the advanced warning light subsystem 611 receives signals from the light controller 610 via the wire interface 1006. Upon receipt of signals from the light controller 610, the control logic 1002 determines whether to activate the advanced warning light 1004, deactivate the advanced warning light 1004, or activate the brake light 1005. In this regard, the signal received indicates whether to activate the advanced warning light 1004, deactivate the advanced warning light 1004, or activate the brake light 1005. In response to the type of signal received, the control logic 1002 either transmits a signal to the advanced warning light 1004 to turn on the advanced warning light 1004, transmits a signal to the advanced warning light 1004 to turn off the advanced warning light 1004, and/or transmits a signal to the brake light 1005 to turn on the brake light 1005.

Figure 11:
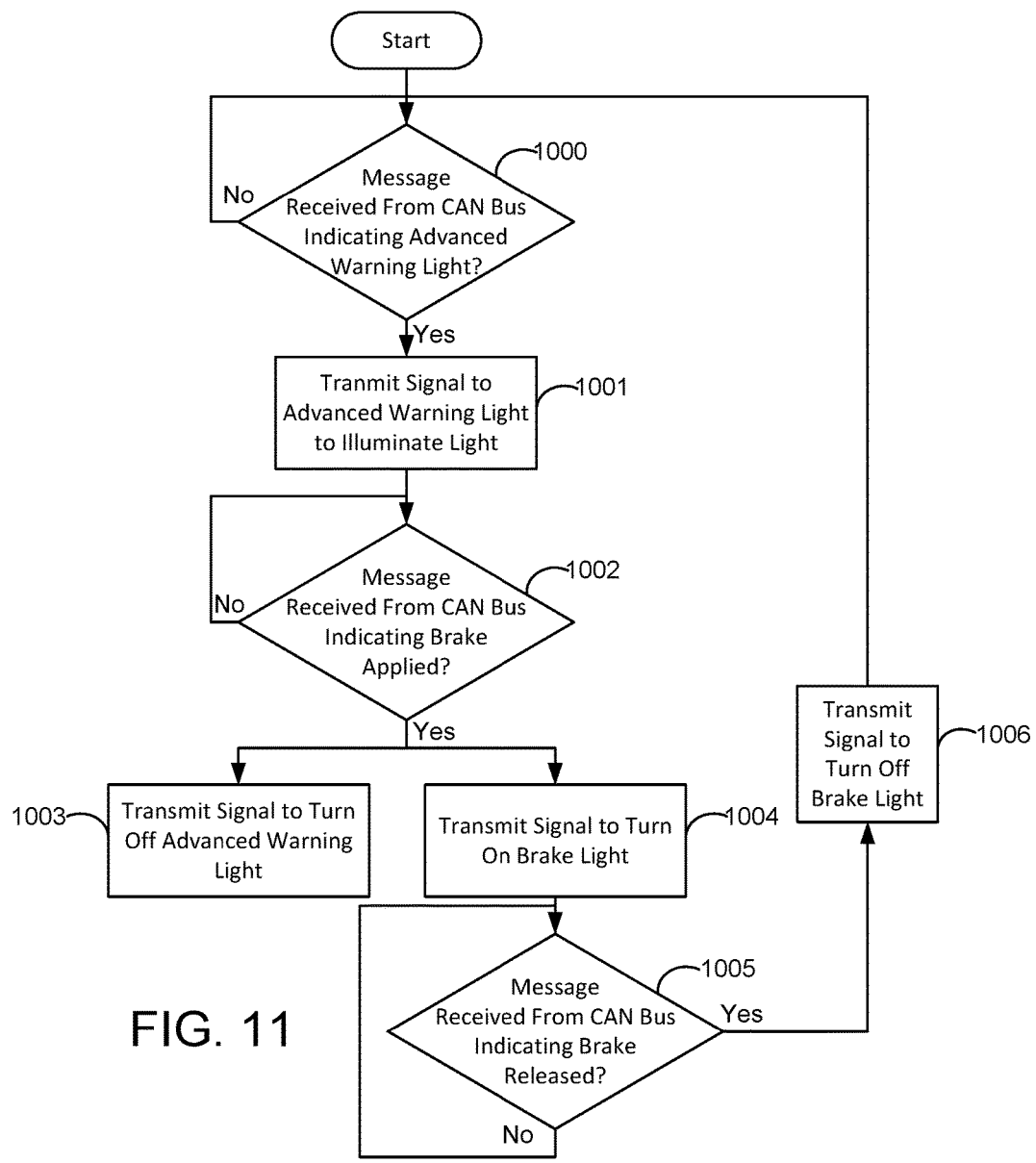
FIG. 11 is a flowchart of exemplary architecture and functionality of the advanced warning light system such as is depicted in FIG. 6.

FIG. 11 is a flowchart of exemplary architecture and functionality of the advanced warning light system depicted in FIGS. 5 and 6.

In step 1000, a message is received from the CAN bus 508 (FIG. 5) or CAN bus 608 (FIG. 6) (hereinafter referred to as the "CAN buses"). If the message contains data that indicates that a parameter has been detected that specifies that the vehicle is slowing down, then the system 500 (FIG. 1) or system 600 (FIG. 6) (hereinafter referred to as "systems") proceeds to step 1001. If the message does not contain data that indicates that a parameter has been detected that specifies that the vehicle is slowing down, the systems continue to listen for messages in step 1000.

In step 1001, if the message indicates that the vehicle is slowing down, the systems transmit a signal to the advanced warning light to illuminate the light. Note that in system 500, the signal is transmitted by the power distribution controller 506 (FIG. 5). However, in system 600, the signal is transmitted by the light controller 610 (FIG. 6). In either scenario, the signal transmitted indicates that the advanced warning light is to be activated. Note that there are a variety of messages that may indicate that the vehicle is slowing down. As mere examples, the message may indicate a change in speed (the vehicle is slowing down) or the message may indicate that pressure has been alleviated from the accelerator.

If a message is received from the CAN buses that the brake has been applied in step 1002, the systems proceed to steps 1003 and 1004. In this regard, the systems transmit a signal to turn off the advanced warning light 804 (FIG. 8) and 1004 (FIG. 10) in step 1003 and transmit a signal to turn on the brake light 805 (FIG. 8) and brake light 1005 (FIG. 10) in step 1004. If no message is received indicating that pressure has been applied to the brake, the systems continue to listen to messages in step 1002.

If a message is received from the CAN buses that the brake has been release in step 1005, the systems proceed to step 1006. In this regard, the systems transmit a signal to turn off the brake lights 805 and 1005. Until the message is received, the brake lights 805 and 1005 remain on in step 1005.

What we claim is:

1. An advanced warning light system of a vehicle, comprising: a brake light attached to a backside of the vehicle, the brake light comprising a plurality of light emitting diodes (LEDs), wherein a portion of the LEDs is an advanced warning light; a controller area network (CAN) bus for transmitting messages; at least one controller configured for monitoring operations of a vehicle prior to actuation of a brake of the vehicle, the at least one controller further configured for transmitting a message on the CAN bus when a monitored operation occurs on the vehicle prior to actuation of the brake of the vehicle, the message comprising data indicating that the vehicle is slowing down not in response to the brake being depressed; and a processor configured for receiving the message from the CAN bus indicating that the vehicle is slowing down, the processor further configured for transmitting a signal to an advanced warning light that illuminates the advanced warning light to indicate to a driver following the vehicle that the vehicle is slowing down not in response to the brake being depressed.

2. The advanced warning light system of claim 1, wherein the at least one controller is an engine controller that monitors a speed of the vehicle and a throttle position of the vehicle.

3. The advanced warning light system of claim 2, wherein the engine controller transmits a message on the CAN bus indicating the speed of the vehicle has decreased or that pressure has been removed from the accelerator.

4. The advanced warning light system of claim 3, wherein the at least one controller is a power distribution controller and the power distribution controller is configured for receiving the message from the engine controller and for transmitting a signal to an advanced warning light that illuminates the light to indicate that the vehicle is slowing down.

5. The advanced warning light system of claim 4, wherein the engine controller is configured for transmitting a message on the CAN bus indicating that pressure has been applied to a brake of the vehicle.

6. The advanced warning light system of claim 5, wherein the power distribution controller is configured for receiving the message that pressure has been applied to the brake and configured for transmitting a signal to the advanced warning light that turns off the light and for transmitting a signal to a brake light to illuminate the brake light.

7. The advanced warning light system of claim 1, wherein the at least one controller is a self-driving processor that monitors a speed of the vehicle and a throttle position of the vehicle.

8. The advanced warning light system of claim 7, wherein the self-driving processor is configured for transmitting a message on the CAN bus indicating that the speed of the vehicle has decreased or that the throttle position has changed indicating that pressure has been removed from the accelerator.

9. The advanced warning light system of claim 8, wherein the at least one controller is a power distribution controller and the power distribution controller is configured for receiving the message from the self-driving processor and for transmitting a signal to an advanced warning light that illuminates the light to indicate that the vehicle is slowing down.

10. The advanced warning light system of claim 4, wherein a self-driving processor is configured for transmitting a message on the CAN bus indicating that pressure has been applied to a brake of the vehicle.

11. The advanced warning light system of claim 10, wherein the power distribution controller is configured for receiving the message that pressure has been applied to the brake and configured for transmitting a signal to the advanced warning light that turns off the light and for transmitting a signal to a brake light to illuminate the brake light.

12. The advanced warning light system of claim 1, further comprising a CAN bus interface that is communicatively coupled to the CAN bus and a light controller and further comprising an advanced warning light subsystem in electrical communication with an advanced warning light and a brake light.

13. The advanced warning light system of claim 12, wherein the CAN bus interface is configured for receiving messages from the CAN bus indicating that the vehicle is slowing down and configured for transmitting a signal to the light controller for illuminating the advanced warning light.

14. The advanced warning light system of claim 13, the light controller is configured for transmitting a signal to the advanced warning light subsystem for illuminating the advanced warning light, and the advanced warning light subsystem is configured for illuminating the advanced warning light indicating to a driver behind the vehicle that the vehicle is slowing down.

15. The advanced warning light system of claim 14, wherein the light controller comprises a first wireless transceiver and the advanced warning light subsystem comprises a second wireless transceiver and communication between the light controller and the advanced warning light subsystem occurs wirelessly.

16. The advanced warning light system of claim 14, wherein the light controller is communicatively coupled to the advanced warning light subsystem via a wire and communication between the light controller and the advanced warning light subsystem occurs over the wire.

17. The advanced warning lighting system of claim 1, wherein the advanced warning light is integral with the vehicle's brake lights.

18. The advanced warning lighting system of claim 1, wherein the advanced warning light is integral with a helmet being worn by a motorcyclist.

19. The advanced warning lighting system of claim 1, wherein the controller is configured to monitor the transmission selector and transmit a message indicating that the transmission selector is in drive.

20. The advanced warning lighting system of claim 19, wherein the controller is configured to monitor the vehicle speed and transmit a message indicating that the speed of the vehicle.

21. The advanced warning lighting system of claim 20, wherein the controller is configured to monitor a throttle position and transmit a message indicating the throttle position.

22. The advanced warning lighting system of claim 1, wherein the controller is a power distribution controller, the power distribution controller is configured to activate the advanced warning light if the speed of the vehicle is greater than 20 miles per hour, the throttle position is less than three percent (3%), and the brake light is off.

23. The advanced warning lighting system of claim 1, wherein the controller is configured to monitor a distance of a nearest forward vehicle and a closure rate with the nearest forward vehicle.

24. The advanced warning lighting system of 1, wherein the controller is a power distribution controller, the power distribution controller is configured to transmit a power signal to the advanced warning light when the closure rate meets a threshold.

25. The advanced warning lighting system of claim 1, wherein the controller is configured to monitor a vehicle speed of the nearest forward vehicle and transmit a message indicating the vehicle speed of the nearest forward vehicle.

26. The advanced warning lighting system of claim 25, wherein the controller is configured to determine if a brake light on the nearest forward vehicle is activated and transmit a message indicating whether the brake light on the nearest forward vehicle is activated.

27. The advanced warning lighting system of claim 26, wherein the controller is configured to determine if the vehicle's brake switch is on and transmit a message indicating whether the vehicle's brake light is on.

28. The advanced warning lighting system of claim 4, wherein the power distribution controller is further configured to activate the advanced warning light if the power distribution controller determines that the nearest forward vehicle is less than fifty feet, the nearest forward vehicle speed is greater than thirty miles per hour, the nearest forward vehicle's brake light is on, and the vehicle's brake switch is off.

29. The advanced warning lighting system of claim 1, wherein the controller is configured to monitor a manifold of the vehicle, a vacuum pressure in an engine of the vehicle, a throttle position of the vehicle, a brake position, and an engine speed, the controller further configured to transmit messages related to the manifold of the vehicle, the vacuum pressure in the engine of the vehicle, the throttle position of the vehicle, the brake position, and the engine speed.

30. The advanced warning lighting system of claim 29, wherein the controller is a power distribution controller, the power distribution controller is configured to receive the messages, determine if the vehicle is slowing down based on the messages, and activate the advanced warning light if the power distribution controller determines that the vehicle is slowing down, based on the messages related to the manifold of the vehicle, the vacuum pressure in the engine of the vehicle, the throttle position of the vehicle, the brake position, and the engine speed.

31. The advanced warning lighting system of claim 1, wherein the advanced warning light illuminates yellow in response to the vehicle slowing down not in response to the brake being depressed.

32. The advanced warning lighting system of claim 1, wherein when a driver of the vehicle depresses the brake the advanced warning light illuminates red.

* * * * *